(12) United States Patent
Min et al.

(10) Patent No.: US 9,482,741 B1
(45) Date of Patent: Nov. 1, 2016

(54) SYSTEM AND METHOD OF LOCATING A RADIO FREQUENCY (RF) TRACKING DEVICE USING A CALIBRATION ROUTINE

(71) Applicant: Position Imaging, Inc., Portsmouth, NH (US)

(72) Inventors: Guohua Min, Exeter, NH (US); Edward L. Hill, Portsmouth, NH (US)

(73) Assignee: Position Imaging, Inc., Portsmouth, NH (US)

( * ) Notice: Subject to any disclaimer, the term of this patent is extended or adjusted under 35 U.S.C. 154(b) by 417 days.

(21) Appl. No.: 14/158,896

(22) Filed: Jan. 20, 2014

Related U.S. Application Data

(60) Provisional application No. 61/754,402, filed on Jan. 18, 2013.

(51) Int. Cl.
   *G01S 3/02* (2006.01)
   *G01S 5/02* (2010.01)

(52) U.S. Cl.
   CPC .................................. *G01S 5/0289* (2013.01)

(58) Field of Classification Search
   CPC ............................... G01S 3/02; G01S 5/0289
   USPC .................................................. 342/465, 463
   See application file for complete search history.

(56) References Cited

U.S. PATENT DOCUMENTS

| | | |
|---|---|---|
| 3,940,700 A | 2/1976 | Fischer |
| 5,010,343 A | 4/1991 | Andersson |
| 5,426,438 A | 6/1995 | Peavey et al. |
| 5,574,468 A | 11/1996 | Rose |
| 5,600,330 A | 2/1997 | Blood |
| 5,657,026 A | 8/1997 | Culpepper et al. |
| 5,923,286 A | 7/1999 | Divakaruni |
| 5,953,683 A | 9/1999 | Hansen et al. |
| 6,167,347 A | 12/2000 | Lin |
| 6,292,750 B1 | 9/2001 | Lin |
| 6,409,687 B1 | 6/2002 | Foxlin |
| 6,417,802 B1 | 7/2002 | Diesel |
| 6,496,778 B1 | 12/2002 | Lin |
| 6,512,748 B1 | 1/2003 | Mizuki et al. |
| 6,593,885 B2 | 7/2003 | Wisherd et al. |
| 6,630,904 B2 | 10/2003 | Gustafson et al. |
| 6,683,568 B1 | 1/2004 | James et al. |
| 6,697,736 B2 | 2/2004 | Lin |

(Continued)

OTHER PUBLICATIONS

Schmidt & Phillips, "INS/GPS Integration Architectures", NATO RTO Lecture Seriers, First Presented Oct. 20-21, 2003; 24 pages.

(Continued)

*Primary Examiner* — Harry Liu
(74) *Attorney, Agent, or Firm* — Schmeiser, Olsen & Watts LLP

(57) ABSTRACT

Position tracking systems and methods for tracking a physical location of a radio frequency (RF) transmitter include an RF transmitter transmitting an RF signal from a plurality of known locations. At least four RF receiver antennae are disposed at unknown locations within range of the RF transmitter to receive the RF signals transmitted from the plurality of known locations. A receiver station in communication with the at least four RF receiver antennae initially calibrates a relative position of each RF receiver antenna with respect to the other RF receiver antennae based on the plurality of known locations and on information acquired in response to the RF signals received at the at least four RF receiver antennae.

17 Claims, 6 Drawing Sheets

(56) References Cited

U.S. PATENT DOCUMENTS

| | | | |
|---|---|---|---|
| 6,721,657 | B2 | 4/2004 | Ford et al. |
| 6,750,816 | B1 | 6/2004 | Kunysz |
| 7,143,004 | B2 | 11/2006 | Townsend et al. |
| 7,190,309 | B2 | 3/2007 | Hill |
| 7,193,559 | B2 | 3/2007 | Ford et al. |
| 7,236,091 | B2 | 6/2007 | Kiang et al. |
| 7,295,925 | B2 | 11/2007 | Breed et al. |
| 7,409,290 | B2 | 8/2008 | Lin |
| 7,443,342 | B2 | 10/2008 | Shirai et al. |
| 7,533,569 | B2 | 5/2009 | Sheynblat |
| 7,646,330 | B2 | 1/2010 | Karr |
| 7,876,268 | B2 | 1/2011 | Jacobs |
| 8,457,655 | B2 | 6/2013 | Zhang et al. |
| 2002/0021277 | A1 | 2/2002 | Kramer |
| 2003/0053492 | A1 | 3/2003 | Matsunaga |
| 2004/0095907 | A1 | 5/2004 | Agee et al. |
| 2004/0176102 | A1 | 9/2004 | Lawrence et al. |
| 2005/0275626 | A1 | 12/2005 | Mueller et al. |
| 2006/0013070 | A1 | 1/2006 | Holm et al. |
| 2006/0061469 | A1 | 3/2006 | Jaeger et al. |
| 2006/0066485 | A1 | 3/2006 | Min |
| 2007/0060384 | A1 | 3/2007 | Dohta |
| 2008/0048913 | A1 | 2/2008 | Macias et al. |
| 2008/0204322 | A1 | 8/2008 | Oswald et al. |
| 2009/0149202 | A1 | 6/2009 | Hill et al. |
| 2009/0243932 | A1 | 10/2009 | Moshfeghi |
| 2010/0103989 | A1 | 4/2010 | Smith et al. |
| 2010/0123664 | A1 | 5/2010 | Shin |
| 2011/0006774 | A1 | 1/2011 | Baiden |
| 2011/0187600 | A1 | 8/2011 | Landt |
| 2011/0210843 | A1 | 9/2011 | Kummetz |
| 2011/0241942 | A1 | 10/2011 | Hill |
| 2011/0256882 | A1 | 10/2011 | Markhovsky et al. |
| 2011/0341942 | | 10/2011 | Hill |
| 2012/0184285 | A1* | 7/2012 | Sampath ............... G01S 5/0236 455/456.1 |
| 2013/0021417 | A1 | 1/2013 | Ota et al. |
| 2013/0036043 | A1 | 2/2013 | Faith |
| 2014/0300516 | A1 | 10/2014 | Min et al. |

OTHER PUBLICATIONS

Farrell & Barth, "The Global Positiong System & Interial Navigation", 1999, McGraw-Hill; pp. 245-252.

Grewal & Andrews, "Global Positioning Systems, Inertial Nagivation, and Integration", 2001, John Weiley and Sons, pp. 252-256.

Jianchen Gao, "Development of a Precise GPS/INS/On-Board Vehicle Sensors Integrated Vehicular Positioning System", Jun. 2007, UCGE Reports No. 20555; 245 pages.

Yong Yang, "Tightly Coupled MEMS INS/GPS Integration with INS Aided Receiver Tracking Loops", Jun. 2008, UCGE Reports No. 20270; 205 pages.

Goodall, Christopher L., "Improving Usability of Low-Cost INS/GPS Navigation Systems using Intelligent Techniques", Jan. 2009, UCGE Reports No. 20276; 234 pages.

Debo Sun, "Ultra-Tight GPS/Reduced IMU for Land Vehicle Navigation", Mar. 2010, UCGE Reports No. 20305; 254 pages.

Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.; 8 pages.

Adrian Schumacher, "Integration of a GPS aised Strapdown Inertial Navigation System for Land Vehicles", Master of Science Thesis, KTH Electrical Engineering, 2006; 67 pages.

Vikas Numar N., "Integration of Inertial Navigation System and Global Positioning System Using Kalman Filtering", M.Tech Dissertation, Indian Institute of Technology, Bombay, Mumbai, Jul. 2004; 69 pages.

Jennifer Denise Gautier, "GPS/INS Generalized Evaluation Tool (GIGET) for the Design and Testing of Integrated Navigation Systems", Dissertation, Stanford University, Jun. 2003; 160 pages.

Farrell, et al., "Real-Time Differential Carrier Phase GPS=Aided INS", Jul. 2000, IEEE Transactions on Control Systems Technology, vol. 8, No. 4; 13 pages.

Filho, et al., "Integrated GPS/INS Navigation System Based on a Gyrpscope-Free IMU", Dincon Brazilian Conference on Synamics, Control, and Their Applications, May 22-26, 2006; 6 pages.

Santiago Alban, "Design and Performance of a Robust GPS/INS Attitude System for Automobile Applications", Dissertation, Stanford University, Jun. 2004; 218 pages.

U.S. Appl. No. 13/293,639, filed Nov. 10, 2011, entitled "Position Tracking System and Method Using Radio Signals and Inertial Sensing"; 26 pages.

International Search Report & Written Opinion in international patent application PCT/US12/64860, mailed on Feb. 28, 2013; 8 pages.

Related U.S. Appl. No. 13/918,295, filed Jun. 14, 2013; 31 pages.

Proakis, John G. and Masoud Salehi, "Communication Systems Engineering", Second Edition, Prentice-Hall, Inc., Upper Saddle River, New Jersey, 2002; 815 pages.

* cited by examiner

SYSTEM AND METHOD OF LOCATING A RADIO FREQUENCY (RF) TRACKING DEVICE USING A CALIBRATION ROUTINE

RELATED APPLICATION

This application claims the benefit of and priority to U.S. provisional application No. 61/754,402, filed Jan. 18, 2013, titled "Method of Locating RFID Tags Using a Calibration Template," the entirety of which is incorporated by reference herein.

FIELD OF THE INVENTION

The invention relates generally to systems and methods of radio frequency (RF) communication. More particularly, the invention relates to systems and methods for tracking the position of RF transmitting devices.

BACKGROUND

In certain applications that track the positions or motion of a mobile transmitter or transducer (i.e., tracked device), it would be helpful to provide a simple, economical means to improve tracking accuracies without the need for complicated or costly receiver network setup or calibration procedures. One commonly used method to track the positions of tracked devices is implemented in current wireless networks that track RFID tags in buildings, on campuses and commercial environments. The tracking in said networks is made possible by placing multiple receivers throughout the tracked area. The receivers identify the signals of the tracked device and use signal amplitude levels to determine rough ranges, typically measured in feet or meters, between the tracked devices and the receivers within the signal reception range of the tracked devices. High accuracy cannot be obtained using signal amplitude, and receivers need to be located at positions on a mapped layout of the building, campus, etc.

The kind of signal strength ranging system described above can work well in an environment that does not require high accuracy position detection for the tracked devices or very fast and accurate receiver position calibration. However, in some applications, requirements may be much more demanding with inch or even sub-millimeter accuracy requirements and fast, easy receiver setup for operation.

Certain computer-based virtual reality applications that track the position of a controller (guns in gaming applications, surgical probes in image guided surgery applications, etc.) require high tracking accuracy of the actual position of the tracked device. Since in these virtual reality applications the device would be registered with screen images provided by software, very high position accuracies are required to provide realistic interaction between the user (i.e., tracked device) and the software program. For applications with high accuracy requirements, simple amplitude detection would not be adequate. A signal time of arrival approach for the tracked device tracking can provide higher accuracies but a complicated calibration process or receiver setup would not be practical.

SUMMARY

All examples and features mentioned below can be combined in any technically possible way.

In one aspect, the invention is related to a position tracking system for tracking a physical location of a radio frequency (RF) transmitter. The position tracking system comprises an RF transmitter transmitting an RF signal from a plurality of known locations. At least four RF receiver antennae are disposed at undetermined locations within range of the RF transmitter to receive the RF signals transmitted from the plurality of known locations. A receiver station is in communication with the at least four RF receiver antennae to initially calibrate a relative position of each RF receiver antenna with respect to the other RF receiver antennae based on the plurality of known locations and on information acquired in response to the RF signals received at the at least four RF receiver antennae.

In another aspect, the invention relates to a method for tracking a physical location of a radio frequency (RF) transmitter. The method comprises receiving, by at least four RF receiver antennae disposed at undetermined locations, RF signals transmitted from a plurality of known locations by an RF transmitter, and calibrating a relative position of each RF receiver antenna with respect to the other RF receiver antennae based on the plurality of known locations and information acquired in response to the RF signals received at the at least four RF receiver antennae.

In still another aspect, the invention relates to a radio frequency (RF) receiver station for tracking a physical location of an RF-transmitting tracked device. The receiver station comprises a controller unit in communication with at least four RF receiver antennae disposed at undetermined locations. The controller unit computes a set of time difference of arrival measurements for each of at least four different transmissions of RF signals from the tracked device and received at each of the at least four RF receiver antennae. A computing system is in communication with the controller unit to receive therefrom the sets of time difference of arrival measurements. The computing system includes memory that stores a position location for each of a plurality of known locations and associates each set of time difference of arrival measurements with one of the known locations. The computer system further comprises a processor configured to compute a relative position of each RF receiver antenna with respect to the other RF receiver antennae based on the plurality of known locations and the sets of time difference of arrival measurements.

DETAILED DESCRIPTION

Figure 1:
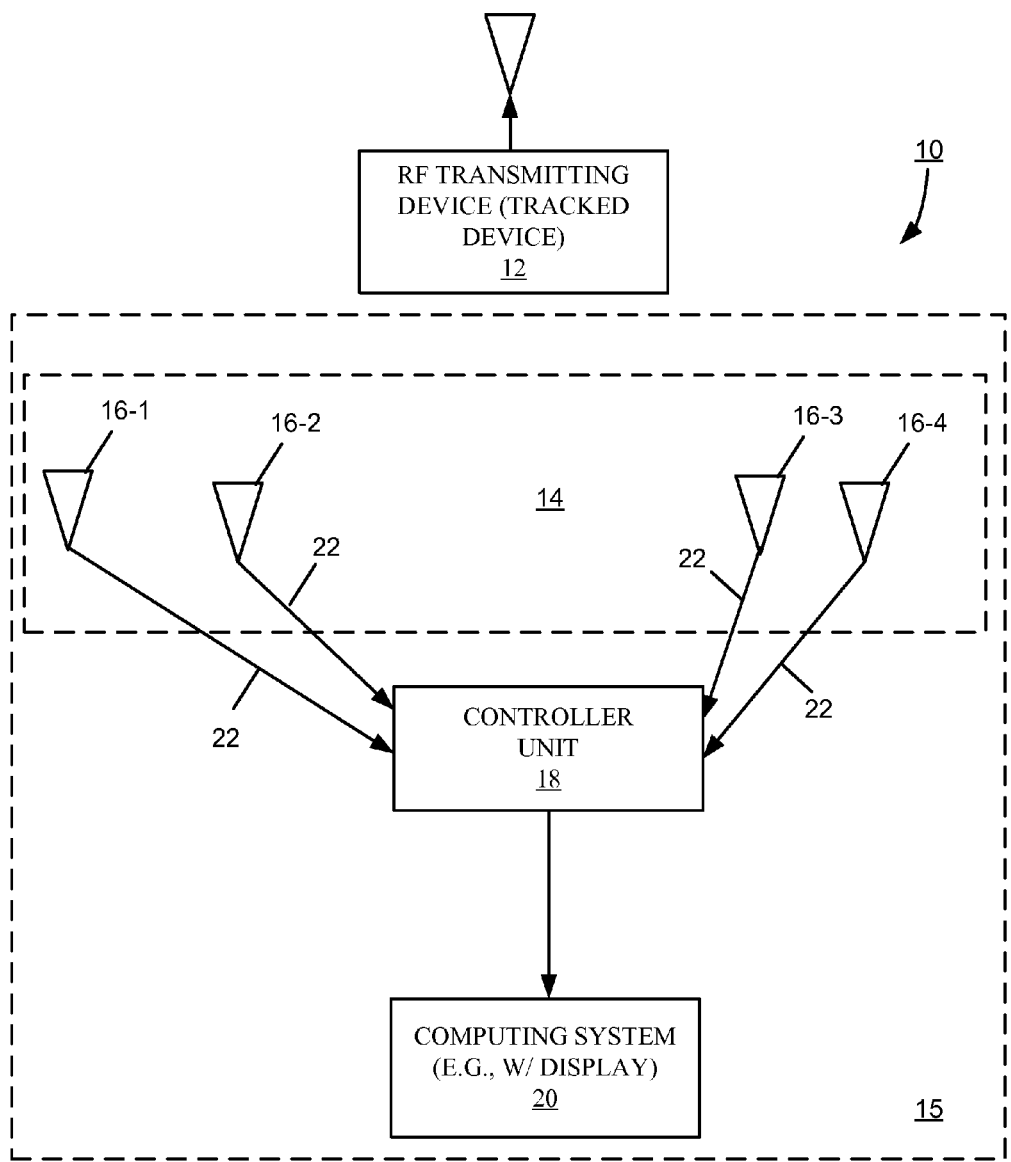
FIG. 1 is a diagram showing an embodiment of a position tracking system.

Described herein are RF communication systems and methods that can help quickly and accurately calculate and calibrate the relative positions of RF receivers, even if such RF receivers are randomly located within the tracking environment (e.g., a room, area, or region). Such RF communication systems include a receiver network of four or more receiver antennae that receive radio transmissions from one or more wireless mobile transmitters or transceivers (referred to as a tracked device) that transmit a radio-based signal to the receiver network; and a receiver station that computes the relative position of each tracked device using time difference of arrival of the signals of the tracked device received by each receiver antenna.

In the RF communication system, the receiver station can compute the relative position of the individual receiver antenna through a self-calibration process that utilizes a template to guide the tracked device, in a three-dimensional environment, to predetermined reference points. As the tracked device moves to each known reference point on the template, the receiver station can use these points to calibrate the relative location of each receiver antenna by utilizing the time difference of arrival information of the received signals to develop a relative geometric layout of the receiver antennae in the receiver network.

For example, in one example configuration, a tracked device transmits a signal that is received by at least four receiver antennae. To calculate the relative positions of each individual receiver antenna in the receiver network, the tracked device is placed on or in a unique calibration template. This template contains a number of known (by the receiver station) three-dimensional geometric reference points that the tracked device fits in or on and is moved through a predetermined sequence of locations. As the tracked device is moved to each point on the template, the multiple receiver antennae receive the signal of the tracked device and the receiver station, by using the known geometry of the reference points on the template and comparing that information with the time difference of arrival of the signal of the tracked device received at each receiver antenna, then computes the individual receiver antenna location.

In one embodiment, the tracked device has a button that sends a predetermined signal to the receiver station. As the tracked device is placed at each reference point of the template, the button is pressed to notify the receiver station to record that position point and reference it to the known position reference points known by the receiver station. After the tracked device has been placed at each reference point and each reference point has been recorded by the receiver station, the receiver station has calibrated the relative positions of the receiver antennae. After the positions of the receiver antennae have been calibrated, the receiver station can use the time difference of arrival of the radio signal to determine the three-dimensional position of the tracked device relative to the receiver network.

FIG. 1 shows an embodiment of a wireless position tracking system 10 for tracking the position of an RF transmitter (i.e., tracked device) 12. The tracked device 12 may be carried by, attached to, or embedded in an object whose position (x, y, z) is to be dynamically determined, and may be part of a transceiver or transducer. Examples of such objects include, but are not limited to, game controllers, TV remote control devices, mobile smart phones, laptop computers, and electronic tablets. The position tracking system 10 includes a receiver network 14 comprised of at least four RF receiver antennae 16-1, 16-2, 16-3, and 16-4 (generally, 16), whose relative positions ($X_i$, $Y_i$, $Z_i$) are unknown (randomly placed), where i corresponds to the number of a particular antenna. Each receiver antenna 16 of the receiver network 16 is located near the RF transmitter 12. At least four RF receiver antennae and one RF transmitter are required for determining the three-dimensional position of the tracked device 12 within the tracking environment.

For calibrating the positions of the receiver antennae 16, a calibration template with a known geometry and test point locations is used for the RF transmitter. As the RF transmitter is moved to each test point on the calibration template, the position tracking system 10 uses the predetermined, known positions to determine the relative positions of the receiver antenna in the receiver network 14.

The wireless position tracking system 10 further includes a receiver station 15 comprised of a controller unit 18 and a computing system 20 (optionally, with a display). During operation, the RF transmitter 12 associated with an object continuously transmits PN (pseudo noise) code modulated RF signals, and the receiver network 14 of receiver antennae 16 receives the modulated signals from RF transmitter 12. The modulated signals are sent to the controller unit 18 over wires or cables 22. The data obtained from controller unit 18 are sent to the computing system 20, which comprises memory and a processor configured to calculate the transmitter antenna position (x, y, z), and then to represent the calculated position on the display screen or to provide the calculated position to other applications for further use. Examples of a system and method for calculating the three-dimensional position of the Tracked Device are described in U.S. application Ser. No. 13/079,800, filed Apr. 4, 2011, and titled "Multiplexing Receiver System," the entirety of which is incorporated by reference herein; examples of a system and method for registering the position of the Tracked Device within a software program are described in U.S. application Ser. No. 13/918,295, filed Jun. 14, 2013, and titled "RF Tracking with Active Sensory Feedback," the entirety of which is incorporated by reference herein.

Figure 2:
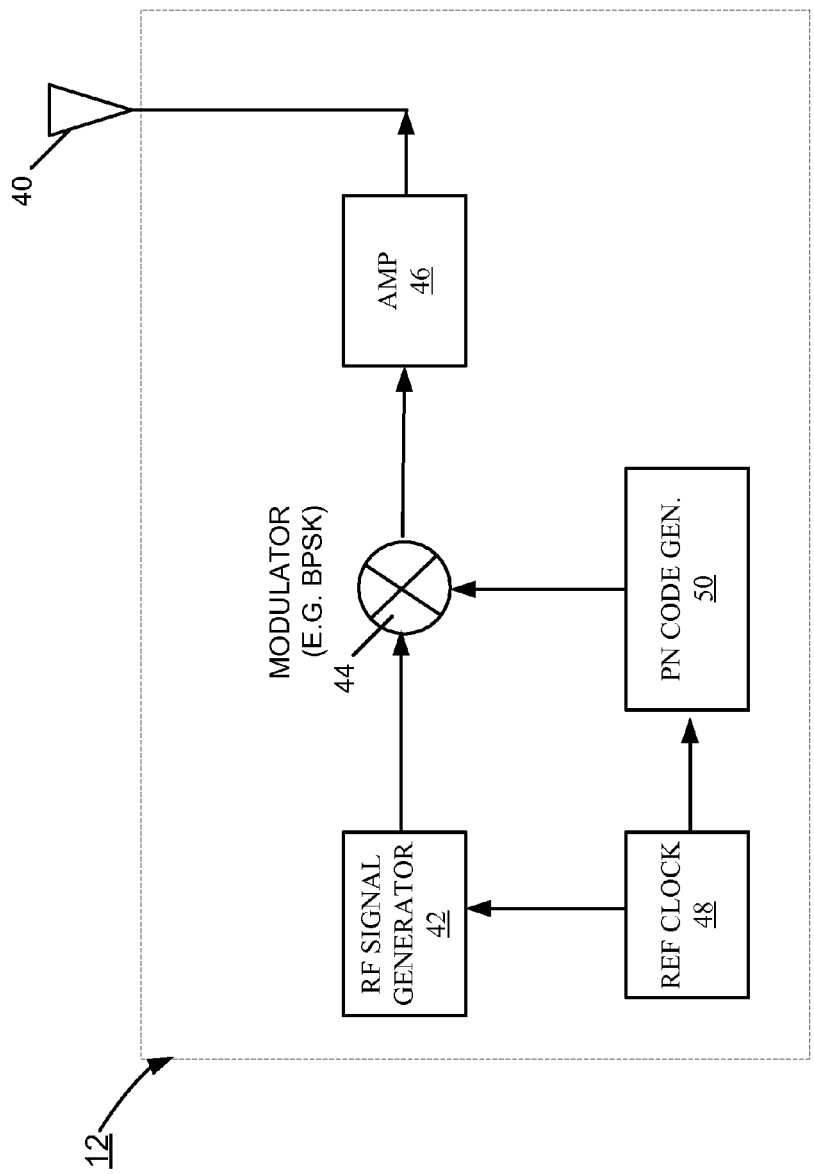
FIG. 2 is a block diagram of an embodiment of a transmitter carried by, attached to, or embedded on an object.

FIG. 2 shows an embodiment of an RF transmitter 12, including an antenna 40, a RF signal generator 42, a modulator 44, an amplifier 46, and a reference oscillator (clock) 48. The RF transmitter 12, which is associated with an object, also has a pseudo-noise (PN) code generator 50 that generates PN signals intrinsic to the object. The reference oscillator 48 provides a stable reference oscillator signal for the PN code generator 50 and the RF signal generator 42. The reference oscillator 48 uses a phase lock loop to generate the stable RF signal.

The modulator 44 (e.g., a Bi-Phase Shift Key (BPSK) modulator) provides a modulated signal to be transmitted through the amplifier 46 and transmitter antenna 40. In one embodiment, the carrier frequency is 2.4 GHz and the PN code chip rate is 80 MHz. The carrier frequency can operate in any other frequency and the PN code chip rate can also be set at other rates.

Figure 3:
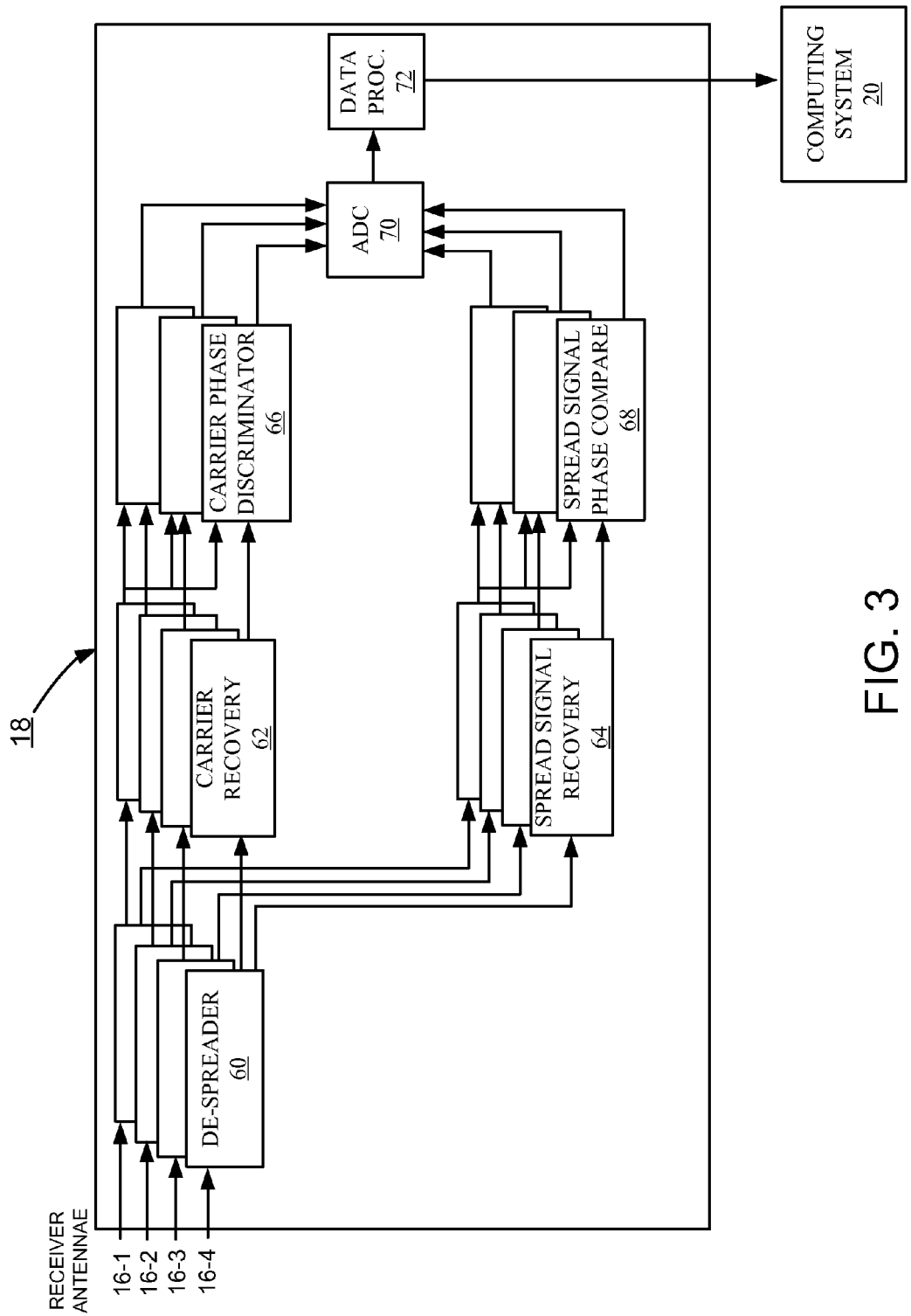
FIG. 3 is a block diagram of an embodiment a single receiver within the plurality of networked receivers.

FIG. 3 shows an embodiment of the controller unit 18, including de-spreader circuitry 60, carrier frequency recovery circuitry 62, spread signal recovery circuitry 64, carrier frequency phase discriminator circuitry 66, spread signal frequency phase comparison circuitry 68, an analog-to-digital converter (ADC) circuit 70, and data processing circuitry 72. The de-spreader circuitry 60 includes a de-spreader circuit for each of the receiver antennae 16. Each de-spreader circuit de-spreads the modulated signal received from its associated receiver antenna 16. Each de-spreader circuit passes its de-spread signal to a carrier frequency recovery circuit 62 and to a spread signal (i.e., code) recovery circuit 64. Each carrier frequency recovery circuitry 62 recovers the carrier signal and each spread signal frequency recovery circuitry 64 recovers the spread signal (a set of PN code correlative pulses) through a correlation process.

The recovered carrier signal and spread signal are sent to the carrier frequency phase discriminator circuitry 66 and to the spread signal phase comparison circuitry (i.e., code discriminator) 68, respectively, to compare the phase differences between the receiver antennae 16. One of the receiver antennae 16 serves as a reference channel. In the embodiment shown, the receiver antenna 16-1 is chosen to be the reference channel. The carrier frequency discriminator circuits 66 determine the phase differences between the receiver antenna 16-2 and receiver antenna 16-1, receiver antenna 16-3 and receiver antenna 16-1, and receiver antenna 16-4 and receiver antenna 16-1 for the carrier signal; and the spread signal phase comparison circuitry 68 determines the phase differences between the receiver antenna 16-2 and receiver antenna 16-1, receiver antenna 16-3 and receiver antenna 16-1, and receiver antenna 16-4 and receiver antenna 16-1 for the spread signal. The spread signal phase compare circuitry 68 and carrier phase discriminator circuitry 66 provide the coarse and fine measurement of the time difference of arrival of the transmitted RF signal, respectively. Combining the coarse and fine time differences of arrival eliminates ambiguity and provides highly accurate position determination.

The ADC 70 receives the carrier phase from the carrier phase discriminator circuitry 66 and the spread signal phase from the spread signal phase compare circuitry 68 and converts these phases into digital form. The data processor 72 receives the digitized phases and computes time difference of arrival using the difference in phase measurements (i.e., carrier phase minus spread signal phase) between each receiver antenna and the reference antenna (e.g., 16-1), and sends the time difference of arrival measurements to the computing system 20.

Figure 4:
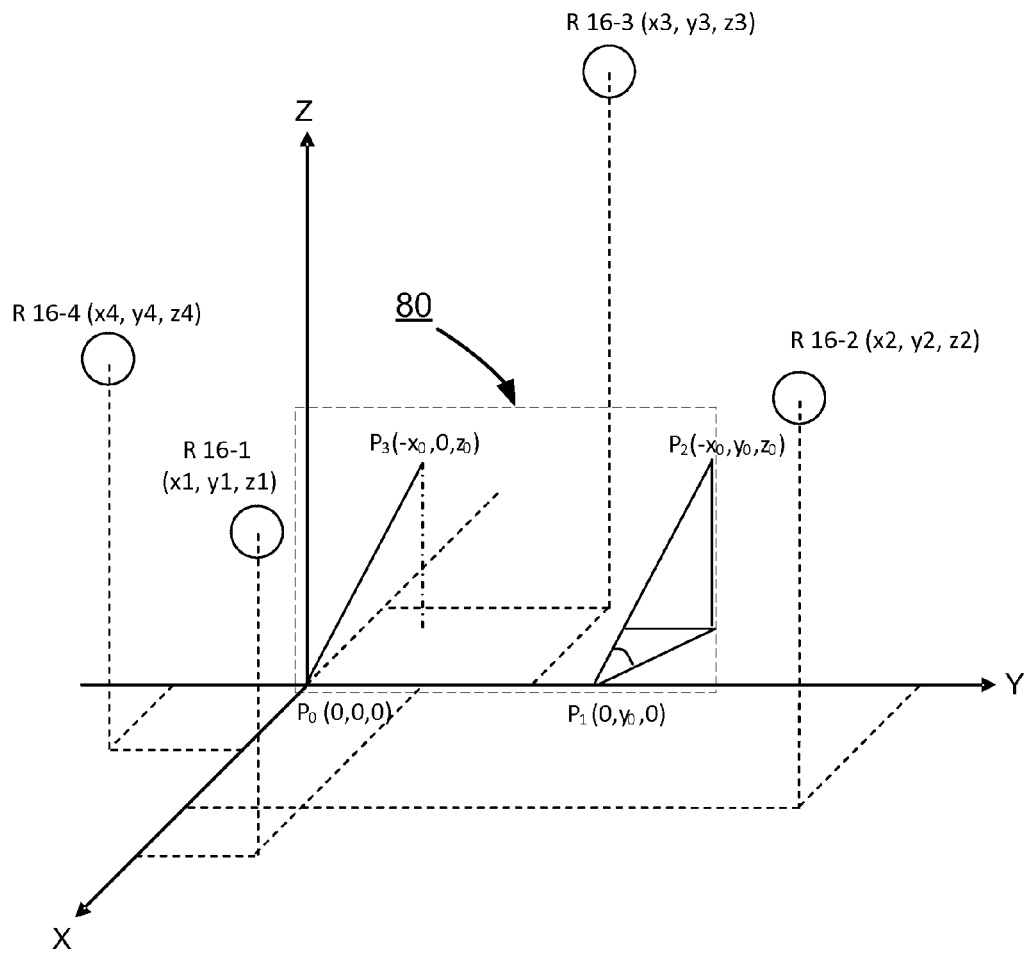
FIG. 4 is a diagram of an embodiment of randomly positioned receiver antennae and the transmitter calibration template.

FIG. 4 shows an example of randomly mounted receiver antennae 16 and a calibration apparatus 80. In this example, the receiver antenna 16-1 is positioned at $(x_1, y_1, z_1)$, the receiver antenna 16-2 is at $(x_2, y_2, z_2)$, the receiver antenna 16-3 is at $(x_3, y_3, z_3)$, and the receiver antenna 16-4 is at $(x_4, y_4, z_4)$, all of which are random locations (i.e., initially unknown) with respect to the calibration apparatus 80. The calibration apparatus 80 can be one or more devices, machines separate from or part of the receiver station 15, examples of which include, but are not limited to, a television and computer monitor. The calibration apparatus 80 provides a calibration template, defined as a plurality of geometric reference points on or in the calibration apparatus 80 known to the receiver station 15. For example, each of the corners of a computer monitor can be adapted to be part of a calibration template, used to calibrate the position tracking system for certain functions as such functions relate to the dimensions of this calibration apparatus. In a computer shooter game that uses the computer monitor for game play display, the corners of the display screen can be calibrated to record the shooting range. During an initial calibration of the positions of the receiver antenna, the tracked device 12 is placed, in succession, at each of these reference points, either on, in, or against the calibration apparatus. Each of the receiver antennae 16 receives the RF signals transmitted by the tracked device. Time difference of arrival measurements between receiver antennae 16 are used to calculate the relative positions of each receiver antenna 16 in the receiver network 14.

In the example shown, the calibration template includes four predetermined locations, referred to as reference points $P_0$, $P_1$, $P_2$, and $P_3$. $P_0$ is placed located at the origin $(0, 0, 0)$, and the other positions $P_1$, $P_2$ and $P_3$ of the calibration template are located at $(0, y_0, 0)$, $(x_0, y_0, z_0)$, and $(x_0, 0, z_0)$, respectively. Each of these reference points is known to the receiver station 15, being stored in the memory of the receiver station. More than four points can be used as reference points, for example, at the middle of each edge of the calibration apparatus 80. In an embodiment with four receiver antennae 16, there are 12 unknown parameters, and, therefore, at least 12 equations are needed to resolve the relative position of each receiver antenna 16. At each calibration reference point P, there are three equations, so at least 4 calibration reference points are needed.

The computing system 20 using the following simultaneous equations to compute locations of the receiver antennae 16, where $f_1$ through $f_{12}$ are the distance differences of antennae locations in relation to the calibration reference points $P_0$-$P_3$. For example, $f_1$, $f_4$, $f_7$, and $f_{10}$ are the distance differences between receiver antennae 16-1 and 16-2 for reference points $P_0$, $P_1$, $P_2$, and $P_3$, respectively; $f_2$, $f_5$, $f_9$, and $f_{12}$ are the distance difference measurements between receiver antennae 16-1 and 16-3, and $f_3$, $f_6$, $f_9$, and $f_{12}$ are the distance difference measurements between receiver antennae 16-1 and 16-4. Using the distance difference, carrier frequency, and speed of light constant, the time difference of arrival is then calculated using the equation: $(t_{1-12} = f_{1-12}/c)$, where c is the speed of light.

At calibration reference point $P_0$:

$$f_1 = \sqrt{x_2^2 + y_2^2 + z_2^2} - \sqrt{x_1^2 + y_1^2 + z_1^2} \qquad (\text{Eq. 1})$$

$$f_2 = \sqrt{x_3^2 + y_3^2 + z_3^2} - \sqrt{x_1^2 + y_1^2 + z_1^2} \qquad (\text{Eq. 2})$$

$$f_3 = \sqrt{x_4^2 + y_4^2 + z_4^2} - \sqrt{x_1^2 + y_1^2 + z_1^2} \qquad (\text{Eq. 3})$$

At calibration reference point $P_1$:

$$f_4 = \sqrt{x_2^2 + (y_2 - y_0)^2 + z_2^2} - \sqrt{x_1^2 + (y_1 - y_0)^2 + z_1^2} \qquad (\text{Eq. 4})$$

$$f_5 = \sqrt{x_3^2 + (y_3 - y_0)^2 + z_3^2} - \sqrt{x_1^2 + (y_1 - y_0)^2 + z_1^2} \qquad (\text{Eq. 5})$$

$$f_6 = \sqrt{x_4^2 + (y_4 - y_0)^2 + z_4^2} - \sqrt{x_1^2 + (y_1 - y_0)^2 + z_1^2} \qquad (\text{Eq. 6})$$

At calibration reference point $P_2$:

$$f_7 = \sqrt{(x_2 + x_0)^2 + (y_2 - y_0)^2 + (z_2 - z_0)^2} - \sqrt{(x_1 + x_0)^2 + (y_1 - y_0)^2 + (z_1 - z_0)^2} \qquad (\text{Eq. 7})$$

$$f_8 = \sqrt{(x_3 + x_0)^2 + (y_3 - y_0)^2 + (z_3 - z_0)^2} - \sqrt{(x_1 + x_0)^2 + (y_1 - y_0)^2 + (z_1 - z_0)^2} \qquad (\text{Eq. 8})$$

$$f_9 = \sqrt{(x_4 + x_0)^2 + (y_4 - y_0)^2 + (z_4 - z_0)^2} - \sqrt{(x_1 + x_0)^2 + (y_1 - y_0)^2 + (z_1 - z_0)^2} \qquad (\text{Eq. 9})$$

At calibration reference point $P_3$:

$$f_{10} = \sqrt{(x_2 + x_0)^2 + y_2^2 + (z_2 - z_0)^2} - \sqrt{(x_1 + x_0)^2 + y_1^2 + (z_1 - z_0)^2} \qquad (\text{Eq. 10})$$

$$f_{11} = \sqrt{(x_3 + x_0)^2 + y_3^2 + (z_3 - z_0)^2} - \sqrt{(x_1 + x_0)^2 + y_1^2 + (z_1 - z_0)^2} \qquad (\text{Eq. 11})$$

$$f_{12} = \sqrt{(x_4 + x_0)^2 + y_4^2 + (z_4 - z_0)^2} - \sqrt{(x_1 + x_0)^2 + y_1^2 + (z_1 - z_0)^2} \qquad (\text{Eq. 12})$$

One embodiment uses the Levenberg-Marquardt (LM) algorithm to compute positioning, which is an iterative technique that locates the minimum of a multivariate function that is expressed as the sum of squares of non-linear real-valued functions. It is a standard technique for non-linear least-squares problems. The LM algorithm can be considered a combination of steepest descent and the Gauss-Newton method. The LM algorithm receives, as input, a vector function f, a measurement vector x, and initial parameters estimate $p_0$, and produces, as output, a vector p minimizing sum of $(x-f(p))^2$.

After the calibration procedure completes, the positions of the receiver antennae 16 are provided. In one embodiment, the computing system 20 computes the position (x,y,z) of the tracked device 12 by using equations with the calibrated known relative three-dimensional positions of the receiver antennae 16. To solve these equations, the computing system 20 uses the time difference of arrival information received from the controller unit 18. An example of the tracking equations, where the subscript 1 represents the reference receiver antenna 16-1, and subscripts 2, 3, and 4 represent the other receiver antennae 16-2, 16-3, 16-4, is below:

$$f_1 = \sqrt{(x_2-x)^2+(y_2-y)^2+(z_2-z)^2} - \sqrt{(x_1-x)^2+(y_1-y)^2+(z_1-z)^2} \quad \text{(Eq. 13)}$$

$$f_2 = \sqrt{(x_3-x)^2+(y_3-y)^2+(z_3-z)^2} - \sqrt{(x_1-x)^2+(y_1-y)^2+(z_1-z)^2} \quad \text{(Eq. 14)}$$

$$f_3 = \sqrt{(x_4-x)^2+(y_4-y)^2+(z_4-z)^2} - \sqrt{(x_1-x)^2+(y_1-y)^2+(z_1-z)^2} \quad \text{(Eq. 15)}$$

where ($x_i$, $y_i$, $z_i$, i=1, 2, 3, 4) are the solution from the calibration procedure (i.e., the now known positions of the receiver antennae 16), and (x, y, z) is the position of the RF transmitter 12 to be computed. $F_1$, $f_2$, and $f_3$ are the measured differences in distance calculated from the time of arrival information (or phase difference information) between receiver antennae 16-1 and 16-2, receiver antennae 16-1 and 16-3, and receiver antennae 16-1 and 16-4, respectively. These equations can be solved using a Kalman filter, a least squares minimization algorithm, or other linear algebra techniques to calculate the (x, y, z) position of the tracked device.

Figure 5:
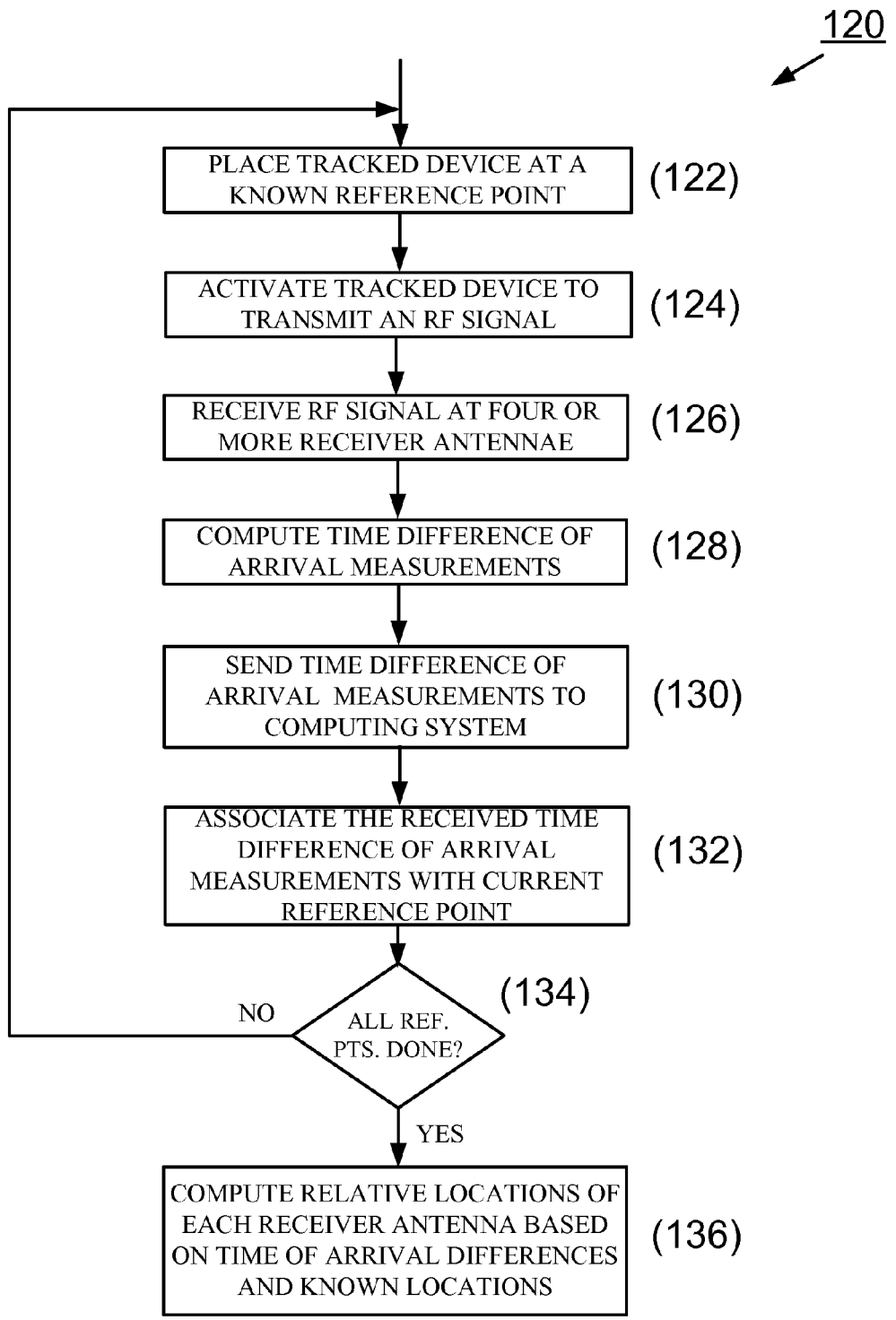
FIG. 5 is a flow diagram of an embodiment of a process for calibrating the locations of receiver antennae in a receiver network.

FIG. 5 shows an embodiment of a process 120 for calibrating the locations of the receiver antennae 16. At step 122, the tracked device 12 is placed at one of the reference points P of the calibration apparatus 80 (FIG. 4). After being positioned at the reference point, the tracked device 12 is activated (step 124), for example, by the press of a button on the device, to transmit an RF signal. Each of the receiver antennae 16 receive (step 126) the RF signal, which pass to the controller unit 18.

At step 128, the controller unit 18 computes time difference of arrival for the RF signal between a chosen reference receiver antenna and each of the other receiver antennae. In one embodiment, the controller unit 18 computes (step 128) the time difference of arrival for the carrier signal and the spread signal obtained from the RF signal, as described in connection with FIG. 3. The controller unit 18 sends (step 130) this set of time difference of arrival measurements to the computing system 20. The computing system 20 associates (step 132) this set of time difference of arrival measurements with the particular known reference point from which the RF signal originated. In one embodiment, the computing system 20 is configured to associate received sets of time difference of arrival measurements with known reference points according to a predefined sequence. For example, the first set of received time difference of arrival measurements is associated with reference point $P_0$, the second received set with reference point $P_1$, and so on.

At step 134, a determination is made whether the calibration process was performed at all or a sufficient number of reference points P. A calibration application executing on the tracked device 12 can guide the user to move the tracked device 12 from one reference point on the calibration apparatus 80 to the next. Alternatively, the calibration apparatus 80 itself can signal to the user where to next place the tracked device 12. After calibration steps (122-130) are performed for all desired reference points P, the computing system 20 computes (step 136) the relative locations of each receiver antenna 16 based on the sets of time difference of arrival measurements and on the known locations of the used reference points, as described in connection with FIG. 4.

Figure 6:
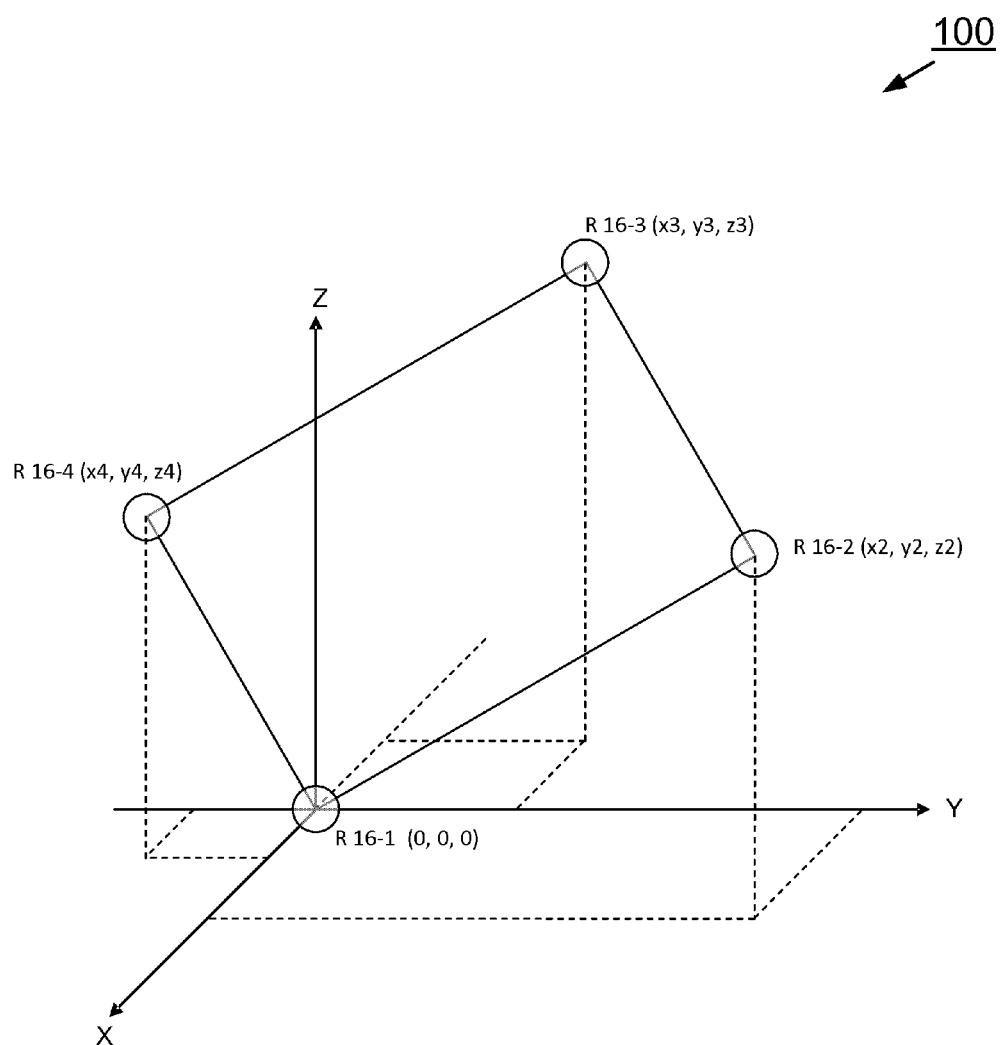
FIG. 6 is a diagram of an embodiment of a rigid receiver antennae arrangement.

FIG. 6 shows an example embodiment having rigidly mounted receiver antennae 16. In one embodiment, the receiver antenna 16-1, as a reference point, is chosen to be at the origin of the coordinate system. In this embodiment, the physical spacing information between the receiver antennae is known; namely, the coordinates of receiver antenna 16-2, receiver antenna 16-3, and receiver antenna 16-4 are known relative to the reference point (i.e., receiver antenna 16-1). Accordingly, calibration is not required because the positions of the receiver antennae are known.

After the positions of the receiver antennae 16 are known, either through the calibration process or through an existing known rigid receiver antennae configuration, one of the receiver antennae (e.g., 16-1) coordinates is taken to be the reference point at origin (0, 0, 0) and the positions of the other receiver antenna 16-2, 16-3, and 16-4 are considered to be at ($x_2$, $y_2$, $z_2$), ($x_3$, $y_3$, $z_3$), and ($x_4$, $y_4$, $z_4$), respectively. The position of the RF transmitter 12 (or tracked device) can then be tracked.

The position calculation function f is described in the "Tracking Equation" below:

$$f_1 = \sqrt{(x_2-x)^2+(y_2-y)^2+(z_2-z)^2} - \sqrt{x^2+y^2+z^2} \quad \text{(Eq. 16)}$$

$$f_2 = \sqrt{(x_3-x)^2+(y_3-y)^2+(z_3-z)^2} - \sqrt{x^2+y^2+z^2} \quad \text{(Eq. 17)}$$

$$f_3 = \sqrt{(x_4-x)^2+(y_4-y)^2+(z_4-z)^2} - \sqrt{x^2+y^2+z^2} \quad \text{(Eq. 18)}$$

where x, y, z are the coordinates of the RF transmitter 3D position relative to the origin receiver antenna 16-1 at (0, 0, 0).

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. The computer readable medium may be a non-transitory computer readable storage medium, examples of which include, but are not limited to, an electronic, magnetic, optical, electromagnetic, infrared, or semiconductor system, apparatus, or device, or any suitable combination thereof.

As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium is not a computer readable propagating signal medium or a propagated signal.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's device, partly on the user's device, as a stand-alone software package, partly on the user's device and partly on a remote computer or entirely on a remote computer or server. Any such remote computer may be connected to the user's device through any type of network, including a local area network (LAN) or a wide area network (WAN), or the connection may be made to an external computer (for example, through the Internet using an Internet Service Provider).

Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the principles of this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of this invention may be implemented as program embedded on personal computer such as JAVA® or CGI script, as a resource residing on a server or graphics workstation, as a plug-in, or the like. The system may also be implemented by physically incorporating the system and method into a software and/or hardware system.

While the aforementioned principles have been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this invention.

What is claimed is:

1. A position tracking system for tracking a physical location of a radio frequency (RF) transmitter, the position tracking system comprising:
    an RF transmitter transmitting an RF signal from each of a plurality of known locations where the RF transmitter is placed in turn;
    at least four RF receiver antennae disposed at undetermined locations within range of the RF transmitter to receive the RF signals transmitted from the plurality of known locations; and
    a receiver station in communication with the at least four RF receiver antennae, the receiver station initially calibrating a relative position of each RF receiver antenna with respect to the other RF receiver antennae based on the plurality of known locations and on information acquired in response to the RF signals received at the at least four RF receiver antennae, the receiver station being configured to compute dynamically a position of an RF-transmitting device based on the calibrated relative positions of the RF receiver antennae after initial calibration.

2. The position tracking system of claim 1, wherein the receiver station comprises:
    a controller unit computing time difference of arrival measurements for the RF signal transmitted from each of the plurality of known locations and received at each of the at least four RF receiver antennae; and
    a computing system determining the relative position of each RF receiver antenna with respect to the other RF receiver antennae based on the computed time difference of arrival measurements and on the plurality of known locations.

3. The position tracking system of claim 1, further comprising an apparatus providing a three-dimensional calibration template with a predefined set of reference points, the apparatus being disposed relative to the receiver station such that each reference point corresponds to one of the plurality of known locations from which the RF transmitter transmits the RF signal.

4. The position tracking system of claim 3, wherein the receiver station refers to a known three-dimensional model of the three-dimensional calibration template when the RF transmitter is placed at each reference point of the calibration template.

5. The position tracking system of claim 3, wherein the RF transmitter is placed at each of the reference points of the calibration template to perform an initial calibration of the relative positions of the at least four RF receiver antennae.

6. The position tracking system of claim 1, wherein the plurality of known locations are all on a same plane.

7. The position tracking system of claim 1, wherein a distance between each of the RF receiver antennae is fixed.

8. A method for tracking a physical location of a radio frequency (RF) transmitting device, the method comprising:
receiving, by at least four RF receiver antennae disposed at undetermined locations, an RF signal transmitted in turn from each of a plurality of known locations by an RF transmitter; and
calibrating a relative position of each RF receiver antenna with respect to the other RF receiver antennae based on the plurality of known locations and information acquired in response to the RF signals received at the at least four RF receiver antennae and
dynamically computing the physical location of the RF-transmitting device based on the relative positions of the at least four RF receiver antennae after the calibrating of the relative position of each RF receiver antenna with respect to the other RF receiver antennae.

9. The method of claim 8, wherein calibrating a relative position of each RF receiver antenna with respect to the other RF receiver antennae includes:
computing time difference of arrival measurements for the RF signal transmitted from each of the plurality of known locations and received at each of the at least four RF receiver antennae; and
computing the relative position of each RF receiver antenna with respect to the other RF receiver antennae based on the computed time difference of arrival measurements and on the plurality of known locations.

10. The method of claim 8, further comprising positioning a three-dimensional calibration template with a predefined set of reference points relative to a given reference point such that each reference point of the predefined set corresponds to one of the plurality of known locations from which the RF transmitter transmits the RF signal.

11. The method of claim 10, further comprising referring to a known three-dimensional model of the calibration template when the RF transmitter is placed at each reference point of the calibration template.

12. The method of claim 10, further comprising placing the RF transmitter at each of the reference points of the calibration template to perform an initial calibration of the relative positions of the RF receiver antennae.

13. The method of claim 8, wherein the plurality of known locations are all on a same plane.

14. The method of claim 8, wherein a distance between each of the RF receiver antennae is fixed.

15. A radio frequency (RF) receiver station for tracking a physical location of an RF-transmitting, tracked device, the receiver station comprising:
a controller unit in communication with at least four RF receiver antennae disposed at undetermined locations, the controller unit computing a set of time difference of arrival measurements for each of at least four different transmissions of RF signals from the tracked device and received at each of the at least four RF receiver antennae; and
a computing system in communication with the controller unit to receive therefrom the sets of time difference of arrival measurements, the computing system including memory that stores a position location for each of a plurality of known locations and associates each set of time difference of arrival measurements with one of the known locations, the computer system further comprising a processor configured to compute a relative position of each RF receiver antenna with respect to the other RF receiver antennae based on the plurality of known locations and the sets of time difference of arrival measurements, the computing system being further configured to compute dynamically the physical location of the RF-transmitting tracked device based on the computed relative ions of the at least four RF receiver antennae after initial calibration.

16. The RF receiver station of claim 15, further comprising an apparatus providing a three-dimensional calibration template with a predefined set of reference points, the apparatus being disposed relative to the computing system such that each reference point corresponds to one of the plurality of known locations.

17. The RF receiver station of claim 16, wherein the memory stores a three-dimensional model of the three-dimensional calibration template.

* * * * *